United States Patent [19]

Kubota et al.

[11] Patent Number: 5,204,379
[45] Date of Patent: Apr. 20, 1993

[54] PHOTOCURABLE ADHESIVE AND PRODUCTION OF LAMINATED ARTICLES USING THE SAME

[75] Inventors: Tsutomu Kubota, Mishima; Tomoyoshi Shinoda, Ibaraki, both of Japan

[73] Assignee: Takeda Chemical Industries, Ltd., Osaka, Japan

[21] Appl. No.: 598,412

[22] Filed: Oct. 18, 1990

[30] Foreign Application Priority Data

Oct. 18, 1989 [JP] Japan .................................. 1-272259

[51] Int. Cl.$^5$ .................... C08F 2/50; C08G 18/76; C08G 18/32; C08G 18/48
[52] U.S. Cl. ........................................ 522/96; 522/97; 528/66; 528/67; 528/75; 428/423.1
[58] Field of Search ...................... 522/96, 97; 528/66, 528/67, 75; 428/423.1

[56] References Cited

U.S. PATENT DOCUMENTS

| | | | |
|---|---|---|---|
| 4,543,404 | 9/1985 | Sugano et al. | 522/90 |
| 4,617,349 | 10/1986 | Nasu et al. | 528/75 |
| 4,671,838 | 6/1987 | Bravet et al. | 428/423.1 |
| 4,731,415 | 3/1988 | Fujita et al. | 525/123 |
| 4,789,600 | 12/1988 | Triebs et al. | 428/425.6 |

*Primary Examiner*—Marion E. McCamish
*Assistant Examiner*—Susan Berman
*Attorney, Agent, or Firm*—Wenderoth, Lind & Ponack

[57] ABSTRACT

A photocurable adhesive which comprises:
(a) a polyurethene poly(meth)acrylate having a polyurethane structure which contains $\alpha, \alpha, \alpha', \alpha'$-tetramethylxylylenediisocyanate as a main polyisocyanate component; and
(b) an adhesive coupling agent in an amount of 0.05–10 parts by weight in relation to 100 parts by weight of the polyurethene poly(meth)acrylate.

A process of producing a laminated film is also disclosed which comprises: coating the photocurable adhesive on a first substate; laminating the first substrate to a second substrate; and applying ultraviolet ray or radiant ray to the resultant laminated film.

9 Claims, No Drawings

PHOTOCURABLE ADHESIVE AND PRODUCTION OF LAMINATED ARTICLES USING THE SAME

FIELD OF THE INVENTION

This invention relates to a photocurable adhesive and production of laminated articles using the same. More particularly, the invention relates to a photocurable adhesive which has a high urethane linkage content and enables the production of laminated articles with excellent gloss. Further, the invention relates to a method of producing laminated articles which have a large adhesive strength and heat resistance immediately after the lamination, so that the laminated articles can be further processed, for instance, creased, scored or folded, or can be used to wrap or envelope articles immediately after the lamination.

DESCRIPTION OF PRIOR ART

Heretofore, laminated or layered articles bonded together with adhesives have been produced usually by a dry lamination process. That is, a solvent adhesive such as an ethylene-vinyl acetate copolymer or a polyurethane adhesive is first applied on a first thin substrate such as a synthetic resin film, paper or metal foil, and dried, and then the first substrate is laminated under pressure to a second thin substrate with nip rolls.

In such a process, the use of a solvent adhesive of small solid content is necessary to apply the adhesive evenly on the substrate, and hence it is also necessary to evaporate a large amount of the solvent to dry the adhesive. Further, a long period of time is needed to attain a sufficient and stable adhesion in the resulting laminated articles after the lamination has been carried out. In other words, there arises a problem that the substrate, such as resin films or metal foils, are readily separated from each other when the resultant laminated articles are creased or scored or folded for the production of boxes immediately after the lamination.

Meanwhile it is necessary to employ a low nip temperature, in particular in print lamination of a film to paper, so that the resultant laminated articles may not be thermally deformed and curl. Such a lamination at a low nip temperature necessitates the use of an adhesive which has a high flowability at a low temperature after being dried. However, an adhesive having a high flowability has generally no large initial adhesive strength. The print lamination has a further reason to necessitate the use of such an adhesive as has a large initial adhesive strength since the resultant laminated articles are usually cut to a suitable length immediately after the lamination.

It is further necessary that an adhesive gets hard after being dried so that it has a large initial adhesive strength immediately after being dried. As will be apparent, such a hard adhesive is less flowable at a low nip temperature, thereby to produce laminated articles of bad appearance.

A method of lamination is already known wherein an ultraviolet ray curable resin is used as an adhesive, as disclosed in Japanese Patent Publication No. 57-23590. An adhesive suitably used in such a lamination process is also known which contains a polyurethane poly(meth)acrylate employing isophorone diisocyanate as a polyisocyanate component, as disclosed in Japanese Patent Application Laid-Open No. 307945/1988.

However, any known photocurable adhesive which contains a polyurethane poly(meth)acrylate has a low urethane linkage content and hence it provides laminated articles having a poor gloss. The increase in urethane linkage content in any known polyurethane poly(meth)acrylate is inevitably attended by decrease in adhesive force.

As above set forth, no photocurable adhesive has been hitherto known which contains a polyurethane poly(meth)acrylate having a high urethane linkage content therein, nor such an adhesive as enables the production of laminates of a film to paper which has a high initial adhesive strength therebetween at a low nip temperature.

SUMMARY OF THE INVENTION

It is, therefore, an object of the invention to provide a photocurable adhesive which contains a polyurethene poly(meth)acrylate of a high urethane linkage content and a high solid content, so that it enables the production of laminated articles with an excellent gloss.

It is a further object of the invention to provide a method of producing laminated articles wherein substrates are laminated together at a low nip temperature and yet have a large initial adhesive strength therebetween, thereby to provide laminated articles which can be further processed, for instance, creased, scored or folded into boxes, or can be used to wrap or envelope articles immediately after the lamination.

In accordance with the invention, there is provided a photocurable adhesive which comprises:

(a) a polyurethene poly(meth)acrylate having a polyurethane structure which contains $\alpha,\alpha,\alpha',\alpha'$-tetramethylxylylenediisocyanate as a main polyisocyanate component; and (b) an adhesive coupling agent in an amount of 0.05-10 parts by weight in relation to 100 parts by weight of the polyurethene poly(meth)acrylate.

Further in accordance with the invention, there is provided a method of producing laminated articles which comprises: applying the above photocurable adhesive on a first substrate, laminating the first substrate to a second substrate; and applying ultraviolet rays or radiant rays to the resultant laminated substrates.

The term "laminated articles" herein means articles of thin substrates laminated or bonded together in the form of layered sheets, and the thin substrate includes resin film, paper and metal foil. There may be mentioned as a preferred example of the laminated articles, for example, a print laminate which is composed of a printed sheet of paper and a synthetic resin film laminated thereto.

The term "(meth)acrylate" includes either acrylate or methacrylate, and the term "(meth)acryloyl" includes either acryloyl or methacryloyl. Thus, the term "polyurethane poly(meth)acrylate" designates polyurethane polyacrylate, polyurethane polymethacrylate, polyurethane poly(acrylate/methacrylate), or mixtures of these.

Further, the adhesive used in the invention may be cured by application thereto of radiant rays such as electron rays, as well as ultraviolet rays, and such adhesives will be also referred to as photocurable adhesives herein.

The photocurable adhesive used in the invention will be first described.

The photocurable adhesive contains as an essential component a polyurethane poly(meth)acrylate having a polyurethane structure which contains α, α, α', α'-tetramethylxylylenediisocyanate as a main polyisocyanate component. The α, α, α', α'-tetramethylxylylenediisocyanate will be referred to as TMXDI hereinafter.

The TMXDI is represented by

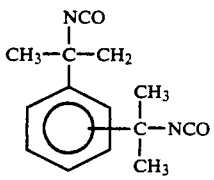

and has meta-, para- and ortho-isomers. Usually a mixture composed of a major portion of meta-isomer and a minor portions of para-isomer is commercially available. However, a mixture containing the ortho-isomer may also be used.

In accordance with the invention, the polyurethane structure in the polyurethane poly(meth)acrylate preferably contains TMXDI in an amount of not less than 60% by weight based on the whole isocyanate component in the polyurethane structure, and more preferably in an amount of not less than 80% by weight. It is most preferred, however, that the whole polyisocyanate component in the polyurethane structure in the polyurethane poly(meth)acrylate is substantially composed of TMXDI.

The polyurethane poly(meth)acrylate may contain, a second polyisocyanate component other than the TMXDI as a polyisocyanate component. The second polyisocyanate compound used include aromatic, aliphatic, alicyclic and aromatic-aliphatic diisocyanates, such as tolylenediisocyanate, diphenylmethanediisocyanate, 3,3'-dimethyldiphenylmethane-4,4'-diisocyanate, naphthylene-1,5-diisocyanate, phenylenediisocyanate, xylylenediisocyanate, 1,6-hexamethylenediisocyanate, 1,4-tetramethylenediisocyanate, isophorone diisocyanate, hydrogenated tolylenediisocyanate, hydrogenated diphenylmethane diisocyanate and hydrogenated xylylenediisocyanate.

The polyurethane poly(meth)acrylate may be produced by reacting TMXDI or a mixture of polyisocyanates containing TMXDI as a major component, or their dimers or trimers, or a prepolymer prepared by adding a compound which has active hydrogens therein to a polyisoctanate, with a vinyl monomer having both hydroxyl groups and vinyl groups, preferably (meth)acryloyl groups therein.

A variety of compounds having active hydrogens therein are usable for the production of the prepolymer or adduct, and the compounds include polyols such as ethylene glycol, propylene glycol, diethylene glycol, dipropylene glycol, triethylene glycol, tetramethylene glycol, neopentyl glycol, butanediol, 1,6-hexanediol, polyoxyethylene glycol, polyoxypropylene glycol, polyoxyethylene polyoxypropylene glycol, polytetramethylene ether glycol, polyoxypropylene triol, polyoxyethylene/oxypropylene triol, trimethylolpropane, glycerine, pentaerythritol, castor oil, bisphenol A-ethylene oxide adducts and bisphenol A-propylene oxide adducts.

Polyester polyols may also be used as the compounds having active hydrogens therein. The polyester polyols may be produced by the conventional reactions of a polybasic carboxylic acid (anhydride) with a polyhydric alcohol. The polybasic carboxylic acids (anhydrides) usable include, for example, maleic acid (anhydride), succinic acid (anhydride), adipic acid, fumaric acid, phthalic acid (anhydride), terephthalic acid, isophthalic acid, methyltetrahydrophthalic acid (anhydride), tetrahydrophthalic acid (anhydride), sebacic acid, dodecanedioic acid, azelaic acid, glutaric acid, trimellitic acid (anhydride), hexahydrophthalic acid (anhydride) and dimer acids. The polyhydric alcohol usable includes, for example, aliphatic glycols such as ethylene glycol, propylene glycol, butylene glycol, hexylene glycol, decanediol or neopentyl glycol; aliphatic polyether glycols such as diethylene glycol or dipropylene glycol; and others such as glycerine, trimethylolpropane, 1,4-cyclohexanedimethanol, neopentyl glycol ester of hydroxypivalic acid, 1,4-cyclohexanediol or hydrogenated bisphenol A.

The compound having active hydrogens therein exemplified by polyols as above described may be used singly or as a mixrure of two or more. It is preferred that the compound has a hydroxyl equivalent of 70-2000, more preferably 130-1300 (in average when a mixture is used).

There may be used as the beforesaid vinyl monomer which has both hydroxyl groups and vinyl groups, preferably (meth)acryloyl groups therein, for instance, N-methylol (meth)acrylamide, hydroxyalkyl (meth)acrylates such as hydroxyethyl (meth)acrylate or hydroxypropyl (meth)acrylate, pentaerythritol mono(meth)acrylate, allyl alcohol, mono(meth)acrylate esters of polyethylene glycol, monovinyl ethers of ethylene glycol or polyethylene glycol, monovinyl ethers of propylene glycol or polypropylene glycol, or Placcel FA-1 (Daicel Kagaku Kogyo K. K.) represented by the formula of

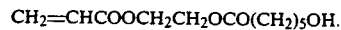

The polyurethane poly(meth)acrylate used in the invention may be produced by the reaction of TMXDI or a mixture of polyisocyanates mainly comprising TMXDI with the vinyl monomer usually in an equivalent ratio of the isocyanate groups of the polyisocyanate compound to the hydroxyl groups in the vinyl monomer.

As a further example of the polyurethane poly(meth)acrylates used in the invention is mentioned a compound having the general formula of

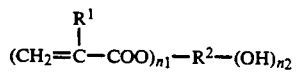

wherein $R^1$ represents hydrogen or methyl, $R^2$ represents a component mainly composed of an urethane component, and $n_1$ evd $n_2$ are independently 1, 2 or 3.

The photocurable adhesive of the invention contains a polyurethane poly(meth)acrylates which contains TMXDI as an essential and major polyisocyanate component in the polyurethane structure, so that the adhesive has a reduced viscosity. Thus, the adhesive has an excellent coatability to a substrate in the production of laminated articles, thereby to provide a coating surface of with no stripe patterns, and lamination of a second substrate to such a coated surface provides laminated articles of excellent appearance.

Further, the polyurethane poly(meth)acrylate contains TMXDI as a major polyisocyanate component in the polyurethane structure, so that the adhesive has a high urethane linkage content, and thus laminated articles produced using such an adhesive has an excellent gloss.

The adhesive used in the invention contains an adhesive coupling agent as an adhesion accelerator. The adhesive coupling agent is preferably a silane coupling agent, a titanate coupling agent or an aluminum coupling agent.

There may be mentioned as the silane coupling agents, for example, aminosilanes such as γ-aminopropyltriethoxysilane, γ-aminopropyltrimethoxysilane, N-β-(aminoethyl)-γ-aminopropylmethyldimethoxysilane, N-β-(aminoethyl)-γ-aminopropylmethyldimethoxysilane or N-phenyl-γ-aminopropyltrimethoxysilane, epoxy silanes such as β-(3,4-epoxycyclohexyl)ethyltrimethoxysilane, γ-glycidoxypropyltrimethoxysilane or γ-glycidoxypropyltriethoxysilane, and vinyl silanes such as vinyltris(β-methoxyethoxy)silane, vinyltriethoxysilane, vinyltrimethoxysilane, or γ-methacryloxypropyltrimethoxysilane, among others which include hexamethyldisilazane or γ-mercaptopropyltrimethoxysilane.

There may be mentioned as the titanate coupling agents, for example, tetraalkoxytitaniums such as tetraisopropoxytitanium or tetra-n-butoxytitanium, butyltitanate dimer, tetrastearyltitanate, triethanolaminetitanate, titanium acetylacetonate, titanium ethylacetylacetonate, titanium lactate, tetraoctylene glycol titanate, tetrakis (2-ethylhexoxy) titanium, tetrastearoxytitanium, isopropyltris(isostearoyl)titanium, isopropyltridecylbenzenesulfonyltitanate, isopropyltris(dioctylpyrophoaphate)titanate, tetraisopropylbis(dioctylphosphite)titanate, tetraoctylbis(ditridecylphosphite)titanate or tetra(2,2-diallyloxymethyl-1-butyl)bis(dioctylpyrophosphate)ethylenetitanate. As the aluminum coupling agents may be mentioned, for example, acetalkoxyaluminum diisopropylates.

Among the above coupling agents, the aminosilanes are most preferred.

The use of the adhesive coupling agent as an adhesion accelerator accelerates the adhesion between the thin substrates and prevents pulse failure when the substrates are separated rapidly, but also it improves resistance to separation of substrates under high temperature conditions, i.e., resistance to creep. Consequently, the resultant laminated articles are prevented from lifting or separation of the substrate when the laminated articles are creased or scored or folded, or are used as wrapping films immediately after the lamination.

The coupling agent is contained in the adhesive in an amount usually of about 0.05–10 parts by weight, preferably in an amount of about 0.1–5 parts by weight, in relation to 100 parts by weight of the polyurethane poly(meth)acrylate. When the amount is too small, the resultant adhesive fails to provide such desired adhesion as described above, but when the amount is too large, the resultant adhesive is unstable.

The adhesive of the invention may contain, if desired, a second photopolymerizable compound therein other than the before described polyurethane poly(meth)acrylate. Such a second photopolymerizable compound usable includes, for example, vinyl monomers having photopolymerizable vinyl groups therein, poly(meth)acrylate esters, epoxy poly(meth)acrylates, polyester poly(meth)acrylates, polybutadiene poly(meth)acrylates, photopolymerizable vinyl oligomers and polymers.

The photopolymerizable vinyl monomers are exemplified by methyl (meth)acrylate, ethyl (meth)acrylate, n-butyl (meth)acrylate, isobutyl (meth)acrylate, 1-ethylpropyl (meth)acrylate, 1-methylpentyl (meth)acrylate, 2-methylpentyl (meth)acrylate, 3-methylpentyl (meth)acrylate, 1-ethylbutyl (meth)acrylate, 2-ethylbutyl (meth)acrylate, 2-ethylhexyl (meth)acrylate, isooctyl (meth)acrylate, 3,5,5-trimethylhexyl (meth)acrylate, decyl (meth)acrylate, dodecyl (meth)acrylate, tetrahydrofurfuryl (meth)acrylate, butoxyethyl (meth)acrylate, ethylcarbitol (meth)acrylate, methyl triglycol (meth)acrylate, phenoxyethyl (meth)acrylate, phenoxypropyl (meth)acrylate, glycerol mono (meth)acrylate, acrylic acid, methacrylic acid, maleic anhydride, fumaric acid, half ester of maleic acid, itaconic acid, N-methylol (meth)acrylamide, hydroxyethyl (meth)acrylate, hydroxypropyl (meth)acrylate, pentaerythritol mono(meth)acrylate, allyl alcohol, mono(meth)acrylate ester of polyethylene glycol, mono(meth)acrylate ester of adducts of alkylene oxides to phenols or alkylphenols.

Further examples of the photopolymerizable vinyl monomers include, for example, monovinyl ethers of ethylene glycol or polyethylene glycol, monovinyl ethers of propylene glycol or polypropylene glycol, Placcel FA-1 as described hereinbefore, aminoethyl (meth)acrylate, N-methylaminoethyl (meth)acrylate, N,N-dimethylaminoethyl (meth)acrylate, N-ethylaminoethyl (meth)acrylate, N,N-diethylaminoethyl (meth)acrylate, allylamine, diallylamine, glycidyl (meth)acrylate, glycidyl allyl ether, styrene, vinyl acetate, acrylonitrile, methacrylonitrile, vinyl ethers, phenoxyethyl (meth)acrylate, phenyl diethylene glycol (meth)acrylate, phenyl tetraglycol (meth)acrylate, 2-hydroxy-3-phenoxypropyl (meth)acrylate, p-nonylphenoxydiethylene glycol (meth)acrylate, N-vinyl pyrrolidone, an acrylate ester P-550A (by Kyoeisha Yushi Kogyo K. K., Japan) having the formula of

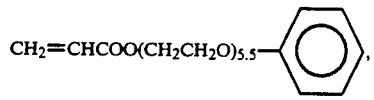

The poly(meth)acrylate esters are exemplified by di-, tri- or tetraethylene glycol di(meth)acrylate, dipropylene glycol di(meth)acrylate, dipentamethylene glycol di(meth)acrylate, tetraethylene glycol di(meth)acrylate, tetraethylene glycol dichloroacrylate, glycerol tri(meth)acrylate, diglycerol di(meth)acrylate, digricerol tetra(meth)acrylate, tetramethylene di(meth)acrylate, ethylene di(meth)acrylate, neopentyl glycol di(meth)acrylate, trimethylolpropane tri(meth)acrylate, pentaerythritol di(meth)acrylate, pentaerythritol tri(meth)acrylate, 1,6-hexanediol di(meth)acrylate, and NK Ester BPE-200 (Shin-Nakamura Kagaku Kogyo K. K., Japan) represented by the formula

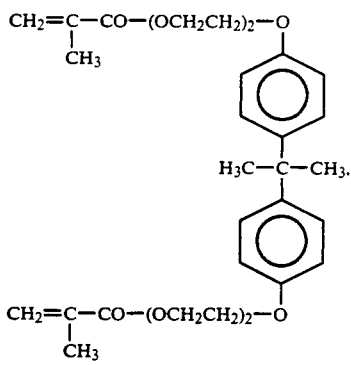

The epoxy poly(meth)acrylates usable in the invention are obtainable by, for example, reacting a compound containing epoxy groups with acrylic acid or methacrylic acid. Therefore, some examples of the epoxy poly(meth)acrylates are Epoxy Ester 40EM (Kyoeisha Yushi Kogyo K. K., Japan), an adduct of methacrylic acid to an epoxy compound, represented by the formula

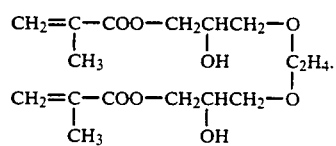

Epoxy Ester 70PA (Kyoeisha Yushi Kogyo K. K., Japan), an adduct of acrylic acid to an epoxy compound, represented by the formula

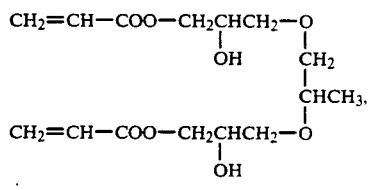

Epoxy Ester 80MFA (Kyoeisha Yushi Kogyo K. K., Japan), an adduct of acrylic acid to an epoxy compound, represented by the formula

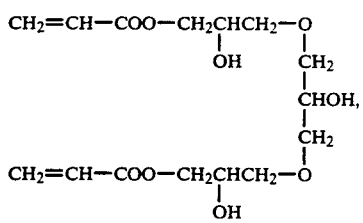

Epoxy Ester 3002M (Kyoeisha Yushi Kogyo K. K., Japan), an adduct of methacrylic acid to an epoxy compound, represented by the formula

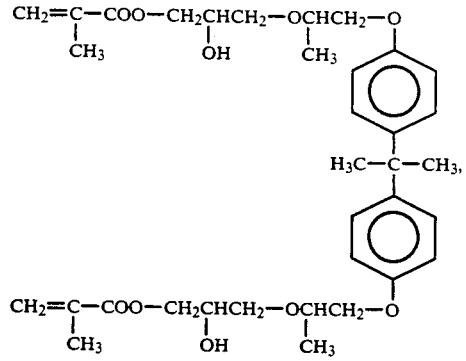

and Epoxy Ester 3002A (Kyoeisha Yushi Kogyo K. K., Japan), an adduct of acrylic acid to an epoxy compound, represented by the formula

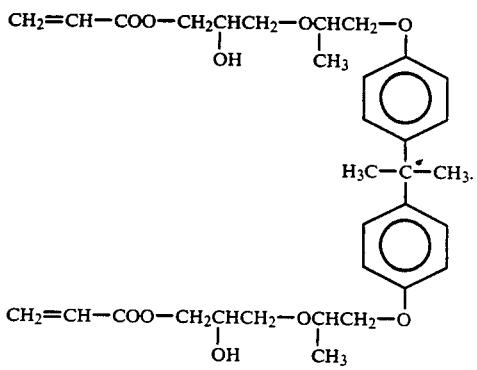

The polyester poly(meth)acrylates usable in the invention are obtainable by, for example, reacting a polyesterpolyol with acrylic acid or methacrylic acid, and are exemplified by HX-220 (Nippon Kayaku K. K., Japan) represented by the formula

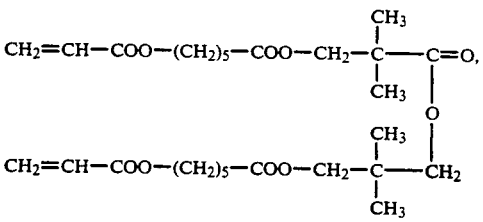

HX-620 (Nippon Kayaku K. K., Japan) represented by the formula

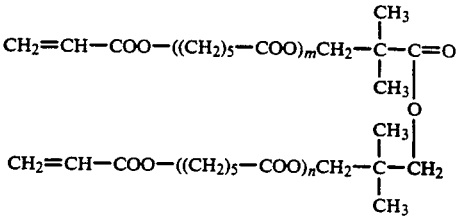

wherein m and n are independently 1, 2 or 3, but $m+n=4$, and Biscoat 3700 (Osaka Yuki Kagaku Kogyo K. K., Japan) represented by the formula

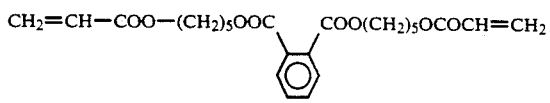

The polybutadiene poly(meth)acrylates include (meth)acrylates obtainable by the reaction of polybutadienediol with acrylic acid or methacrylic acid, and hence are exemplified by Quinbeam 101 (Nippon Zeon K. K., Japan) having a vinyl equivalent of 355 and a viscosity of 21000 cps at 25° C.

The adhesive of the invention polymerizes rapidly by photoirradiation. The photoirradiation herein means the irradiation of light, usually ultraviolet light of the wavelength of about 180–460 nm. The source of such ultraviolet light includes low-, medium-, high- and ultra high-pressure mercury lamps, xenon lamps, ultraviolet fluorescent lamps and carbon arc lamps. When necessary, radiation such as alpha rays, beta rays, gamma rays, X-rays or electron rays are usable.

When ultraviolet light is used to cure the adhesive, the adhesive usually contains photosensitizers, which are exemplified by benzoin compounds such as benzoin, benzoin methylether, benzoin ethylether, benzoin isobutylether or benzoin octylether; carbonyl compounds such as benzil, diacetyl, diethoxyacetophenone, 2-hydroxy-2-methylpropiophenone, 4'-isopropyl-2-hydroxy-2-methylpropiophenone, methylanthraquinone, acetophenone, benzophenone, methyl benzoylformate, benzyl methyl ketal, 1-hydroxycyclohexyl phenyl ketone or 2-methyl-1-(4-(methylthio)phenyl)-2-morpholino)propene-1; sulfur compounds such as diphenyl disulfide or dithiocarbamate; naphthalene compounds such as α-chloromethylnaphthalene; fused aromatic hydrocarbons such as anthracene; and metal salts such as iron chloride.

These photosensitizers are used usually in an amount of about 0.01–20 parts by weight, preferably about 0.1–10 parts by weight, in relation to 100 parts by weight of the photopolymerizable compounds used including the polyurethane poly(meth)acrylate and if any the second photopolymerizable compounds. However, when ionizing electromagnetic radiation is used such as electron rays or gamma rays, the adhesive may contain no photosensitizers therein since the adhesive cures rapidly in the absence of photosensitizers by the irradiation to the adhesive.

The adhesive used in the invention may further contain therein, in addition to the foregoing, various additives which are known in the art, such as fillers, softeners, antioxidants, stabilizers, tackifiers, leveling agents, antifoaming agents, organic solvents or plasticizers.

There may be used, as the tackifiers, for instance, rosins such as rosin acid, polymerized rosin, rosin acid ester, modified rosin, modified rosin ester, hydrogenated rosin, hydrogenated polymerized rosin or hydrogenated rosin acid, or resins such as terpene resin, terpene phenol resin, aromatic hydrocarbon resin, aliphatic hydrocarbon resin or petroleum resin.

The photopolymerizable adhesive of the invention contains the polyurethane poly(meth)acrylate wherein the polyurethane structure has TMXDI as an essential and major polyisocyanate component and the coupling agent together with additives if desired, dissolved in an organic solvent or a mixture of water and organic solvents. Thus, the adhesive has a feature that it can be coated evenly either when it has the same solid content as a conventional low solid content adhesive or when it has a solid content of as high as 100–40% by weight.

The solvent preferably used includes, for example, lower aliphatic alcohols such as methanol or isopropanol, lower alkyl esters of aliphatic lower carboxylic acids such as ethyl acetate, dialkyl ketones such as acetone or methyl ethyl ketone, or aromatic hydrocarbons such as benzene, toluene or xylene. When aqueous organic solvents are used, the alcohols or ketones as mentioned above are preferably used. Most preferably, isopropanol or mixtures of water and isopropanol are used as the solvent.

The photocurable adhesive of the invention is suitably used for the production of laminated articles. When used for this purpose, it is preferred that the adhesive has a glass transition temperature of not more than about 20° C., preferably not more than about 5° C., after a solvent has been evaporated if the adhesive contains a solvent when the substrates are bonded and laminated together. An adhesive having such a low glass transition temperature has a good flowability at a low nip temperature, and hence the substrates are bonded and laminated together without being thermally deformed and curling to provide laminated articles of excellent appearance.

According to the process of the invention, the photocurable adhesive is at first full coated on a first substrate, and if necessary, the solvent contained therein is evaporated, and then a second substrate bonded and laminated together to the first substrate at low nip temperatures usually by means of room temperature nip rolls or if necessary by means of heat nip rolls. Then, ultraviolet rays or radiant rays are applied to the layered substrates usually over a period ranging from about 0.01 seconds to 60 seconds, thereby to photocure the adhesive, to provide laminated articles which have high adhesive strength between the first and second substrates and high heat resistance immediately after the lamination as well as excellent appearance.

In the production of the laminated articles, when at least one of the substrates used allows the permeation of ultraviolet ray therethrough, for example, when a transparent resin film is used, ultraviolet rays are applied to the transparent film. However, when either films have full printings thereon or are metal foils which prevents the permeation of ultraviolet ray, then radiant ray such as electron ray is applied to the films after the lamination. The radiant ray permeates either opaque films or metal foils so that it may be applied to either sides of the laminated films.

In the conventional print lamination, substrates are laminated and bonded together at a nip temperature of about 40°–100° C. When a high nip temperature is employed within the above range, strong adhesion is attained between the substrates, but the resultant laminate is thermally deformed and curled so that it has a bad appearance. Thus, it is preferred that the nip temperature is low, however, when a low nip temperature is employed, a sufficient adhesion is not attained between the substrates, and the resultant laminated article does not stand practical use.

In contrast to the above, the method of the invention enables a sufficient adhesion between the substrates at a low nip temperature, usually in the range of 5°–60° C., preferably 15°–40° C., and most preferably 20°–40° C., to provide laminated articles of excellent appearance and gloss.

Usually in the process of the invention, the first and second substrates are fed continuously in line while the first substrate is coated with the adhesive and laminated to the second substrate, and then the resultant layered sheets are irradiated, so that the irradiation amount is controllable by selecting the speed at which the substrates are carried and the time for which the radiant rays are applied thereto. The speed may range usually from 1-300 m/minute.

As hereinbefore set forth, the substrate includes synthetic resin film, paper and metal foil. Although not limited, the film is usually not more than about 1 mm in thickness. When ultraviolet ray is applied to the photocurable adhesive, a transparent resin film is used as at least one component of the laminated articles.

The resin film may be composed of, for example, polyvinyl chloride resin, polyvinylidene chloride, polyethylene, polypropylene, polystyrene, ABS resin, polyamide, polyester, polyurethane, polyvinyl alcohol, ethylene-vinyl acetate copolymer or chlorinated polypropylene. The film may be colorless and transparent, or may carry thereon printed letters or patterns. There may be preferably used aluminum foil as a metal foil.

The paper used includes simili, wood free paper, kraft paper, art coat paper, caster coat paper, bowl paper, artificial perchment, waterproof paper, glassine paper and linerboard. The paper may carry printed patterns or letters thereon. When an adhesive is applied to paper, the paper may have a window.

The adhesive is coated on a substrate usually in such an amount that the adhesive form a layer of about 0.1-1000 µm, preferably about 1-50 µm, in a thickness on the substrate. Any coating means may be adopted to apply the adhesive to a substrate, for example, a natural coater, a knife belt coater, a floating knife, a knife-over-roll, a knife-on-blanket, a spray coater, a dip coater, a kiss roll, a squeeze coater, a reverse coater, an air blade coater, a curtain flow coater or a gravure coater.

The photocurable adhesive used in the invention cures rapidly and attains a substantially final large adhesive force by irradiation of light thereto, and thus the resultant laminated articles can stand on-line cutting to a desired length and can be further processed as hereinbefore set out. Further, the adhesive is a single component adhesive which has a high solid content and yet which has a high flowability, so that the amount of the solvent evaporated when the adhesive is dried is small, and there arises substantially no problem of environmental pollution.

The invention will now be described with reference to the following examples, which however are intended to illustrate the invention only and are not to be construed as limiting the scope of the invention. In the examples, weights and percentages are by weight.

EXAMPLES

Preparation of Polyurethane Diacrylate A

An amount of 236 parts of polyoxypropylene glycol having an average molecular weight of 1000, an amount of 95.1 parts of dipropylene glycol and 250 parts of TMXDI were reacted in 150 pats of ethyl acetate, and then 18.6 parts of hydroxyethyl acrylate were added to the resulting reaction mixture so that the remaining TMXDI was reacted therewith to provide a polyurethane diacrylate. Finally, an amount of 250 parts of isopropyl alcohol was added to provide a liquid A.

Preparation of Polyurethane Diacrylate B

An amount of 269 parts of polyoxypropylene glycol having an average molecular weight of 1000, an amount of 81.4 parts of dipropylene glycol and 232 parts of TMXDI were reacted in 150 parts of ethyl acetate, and then 17.3 parts of hydroxyethyl acrylate were added to the resulting reaction mixture so that the remaining TMXDI was reacted therewith to provide a polyurethane diacrylate. Finally, an amount of 250 parts of isopropyl alcohol was added to provide a liquid B.

Preparation of Polyurethane Diacrylate C

An amount of 2588 parts of polyoxyethylene polyoxypropylene glycol having an oxyethylene content of about 75% and an average molecular weight of 2200, an amount of 1412 parts of 2-n-butyl-2-ethyl-1,3-propanediol and 2686 parts of TMXDI were reacted in 2307 pats of methyl ethyl ketone and then 236 parts of hydroxyethyl acrylate were added to the resultant reaction mixture so that the remaining TMXDI was reacted therewith to provide a polyurethane diacrylate. Finally, an amount of 2308 parts of isopropyl alcohol was added to provide a liquid C.

Preparation of Polyurethane Diacrylate D

An amount of 331 parts of isophthalic acid, 402 parts of sebacic acid, 376 parts of neopentyl glycol and 73 parts of ethylene glycol were reacted to provide a polyester polyol having a hydroxyl equivalent of 1250.

An amount of 8778 parts of the above polyester polyol, 224 parts of 1,3-butanediol and 1709 parts of TMXDI were reacted in 2744 pats of ethyl acetate and then 265 parts of hydroxypropyl acrylate were added to the resultant reaction mixture so that the remaining TMXDI was reacted therewith to provide a polyurethane diacrylate. Finally, an amount of 4520 parts of isopropyl alcohol was added to provide a liquid D.

Preparation of Polyurethane Diacrylate E

An amount of 664 parts of adipic acid and 522 parts of 1,4-butylene glycol were reacted to provide a polyester polyol having an average molecular weight of about 1000 and a hydroxyl equivalent of 500.

An amount of 2919 parts of the above polyester polyol, 681 parts of dipropylene glycol and 2198 parts of TMXDI were reacted in 1812 pats of ethyl acetate and then 240 parts of hydroxyethyl acrylate were added to the resultant reaction mixture so that the remaining TMXDI was reacted therewith to provide a polyurethane diacrylate. Finally, an amount of 1208 parts of p-nonylphenoxydiethylene glycol acrylate was added to provide a liquid E.

Preparation of Polyurethane Di- and Tri acrylate F

An amount of 307 parts of polyoxypropylene glycol having an average molecular weight of about 1000, 93 parts of dipropylene glycol, 10 parts of trimethylolpropane and 298.9 parts of TMXDI were reacted in 186 pats of ethyl acetate and then 34.6 parts of hydroxyethyl acrylate were added to the resultant reaction mixture so that the remaining TMXDI was reacted therewith to provide a polyurethane di- and triacrylate. Finally, an amount of 310 parts of isopropyl alcohol was added to provide a liquid F.

Preparation of Adhesives

The polyurethane diacrylates prepared as above, a coupling agent, a photosensitizer (not used when electron ray was irradiated) and a solvent were admixed together in amounts (parts) as shown in the Table 2, to provide adhesive 1-12.

Production of Laminated Articles

The adhesive was coated on a first resin film or a printed paper, and the solvent was evaporated therefrom. Then, a second resin film or a metal foil was laminated to the first substrate, and ultraviolet rays or electron rays were applied thereto. The ultraviolet rays were irradiated from a height of 10 cm for two to three seconds with a high pressure mercury lamp having an irradiation tube of one meter long.

Immediately after the lamination, the appearance of the resultant laminated articles was observed. Further, the laminated articles were subjected to measurement of 180° separation adhesive strength (temperature: 23° C., relative humidity: 50%, peeling speed: 300 mm/min.), resistance heat creep, resistance to enfolding, resistance to kerosine, resistance to pulse, T-type separation adhesive strength (temperature: 23° C., relative humidity: 50%, peeling speed: 300 mm/min.), and heat seal strength. The results are shown in the Table 3.

TABLE 1

| Composition of Adhesive (parts by weight) | Adhesives | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Liquid A | 100 | 100 | — | — | — | — | — | — | — | — | — | — |
| Liquid B | — | — | 100 | 100 | — | — | — | — | — | — | — | — |
| Liquid C | — | — | — | — | 100 | 100 | — | — | — | — | — | — |
| Liquid D | — | — | — | — | — | — | 100 | 100 | — | — | — | — |
| Liquid E | — | — | — | — | — | — | — | — | 100 | 100 | — | — |
| Liquid F | — | — | — | — | — | — | — | — | — | — | 100 | 100 |
| Isopropyl alcohol | 34.8 | 34.8 | 35.4 | 35.4 | 34.8 | 34.8 | — | — | — | — | 15.0 | 15.0 |
| Ethyl acetate | — | — | — | — | — | — | 35.0 | 35.0 | 15.0 | 15.0 | — | — |
| γ-aminopropoyltriethoxysilane | 0.6 | 0.6 | 0.6 | 0.6 | — | — | 0.6 | 0.6 | 0.8 | 0.8 | — | — |
| Tetraisopropoxytitanium | — | — | — | — | 0.6 | 0.6 | — | — | — | — | 0.6 | 0.6 |
| 2,2-Dimethoxy-2-phenyl-acetophenone | — | — | 0.4 | — | 0.3 | — | — | — | — | — | — | — |
| 1-Hydroxycyclohexyl phenyl ketone | — | — | 0.4 | — | 0.3 | — | — | — | — | — | — | — |
| 2-Hydroxy-2-methyl-propiophenone | 0.3 | — | — | — | — | — | 0.5 | — | 1.0 | — | 0.8 | — |
| Antioxidant | 0.3 | — | 0.3 | — | — | — | — | — | — | — | — | — |
| Solid content (%) | 45.0 | 44.8 | 45.0 | 44.6 | 45.0 | 44.8 | 45.0 | 44.8 | 70.0 | 69.8 | 52.7 | 52.4 |
| Viscosity at 25° C. (cps) | 130 | 140 | 100 | 95 | — | — | — | — | — | — | — | — |

TABLE 2

| | Examples | | | | | | | | | |
|---|---|---|---|---|---|---|---|---|---|---|
| | 1 | 2 | 3 | 4 | 5 | 6 | 7 | 8 | 9 | 10 |
| Production of Laminated Film | | | | | | | | | | |
| Adhesive used | 1 | 1 | 2 | 2 | 3 | 3 | 4 | 5 | 6 | 7 |
| Construction of laminated Film[1)] | | | | | | | | | | |
| First substrate | OPP | PVC | OPP | ON | Paper* | Paper* | ON | OPP | ON | OPP |
| Second substrate | Paper | Paper | Paper | LLDPE | PVC | OPS | LLDPE | Paper | LLDPE | Paper |
| Adhesive coated surface | OPP | PVC | OPP | ON | Paper* | Paper* | ON | OPP | ON | OPP |
| Amount of adhesive coated (solid, g/m²) | 4.0 | 7.0 | 4.0 | 3.0 | 7.0 | 7.0 | 3.0 | 4.0 | 3.0 | 4.0 |
| Line speed (m/min.) | 25 | 20 | 25 | 40 | 20 | 25 | 40 | 25 | 40 | 25 |
| Temperature of nip rolls (°C.) | 30 | 30 | 30 | 30 | 30 | 30 | 30 | 30 | 30 | 30 |
| Radiant rays[2)] | UV | UV | E | E | UV | UV | E | UV | E | UV |
| Irradiated surface | OPP | PVC | OPP | ON | PVS | OPS | ON | OPP | ON | OPP |
| UV Irradiation (W/cm) | 120 | 100 | — | — | 100 | 120 | — | 120 | — | 120 |
| Electron ray irradiation (Mrad) | — | — | 3 | 3 | — | — | 3 | — | 3 | — |

| | Examples | | | | |
|---|---|---|---|---|---|
| | 11 | 12 | 13 | 14 | 15 |
| Production of Laminated Film | | | | | |
| Adhesive used | 8 | 9 | 10 | 11 | 12 |
| Construction of laminated Film[1)] | | | | | |
| First substrate | ON | Paper* | PET | OPP | ON |
| Second substrate | LLDPE | PVC | LLDPE | Paper | LLDPE |
| Adhesive coated surface | ON | Paper* | PET | OPP | ON |
| Amount of adhesive coated (solid, g/m²) | 3.0 | 7.0 | 3.0 | 4.0 | 3.0 |
| Line speed (m/min.) | 50 | 20 | 40 | 25 | 50 |
| Temperature of nip rolls (°C.) | 30 | 30 | 30 | 30 | 30 |
| Radiant rays[2)] | E | UV | E | UV | E |
| Irradiated surface | ON | PVC | PET | OPP | ON |
| UV Irradiation (W/cm) | — | 120 | — | 120 | — |
| Electron ray irradiation (Mrad) | 3 | — | 3 | — | 3 |

TABLE 3

| | Examples | | | | | | | | | |
|---|---|---|---|---|---|---|---|---|---|---|
| | 1 | 2 | 3 | 4 | 5 | 6 | 7 | 8 | 9 | 10 |
| Properties of Laminated Film | | | | | | | | | | |
| Appearance | Good | Good | Good | Good | Good | Good | Good | Good | Good | Good |
| 180° Separation Adhesive strength (g/15 mm breadth) | 200 | 300 | 200 | — | 750 | 280 | — | 220 | — | 230 |
| Resistance to heat creep (mm/hr)[3] | 0 | 0 | 0 | — | 0 | 0 | — | 0 | — | 0 |
| Creasability[4] | Good | Good | Good | — | Good | Good | — | Good | — | Good |
| Resistance to kerosine[5] | Good | Good | Good | — | Good | Good | — | Good | — | Good |
| Resistance to pulse[6] | Good | Good | Good | Good | Good | Good | Good | Good | Good | Good |
| T-type Separation adhesive strength (g/15 mm breadth) | — | — | — | 550 | — | — | 520 | — | 510 | — |
| Heat seal strength[7] (Kg/15 mm breadth) | — | — | — | 4.0 | — | — | 3.8 | — | 3.9 | — |

| | Examples | | | | |
|---|---|---|---|---|---|
| | 11 | 12 | 13 | 14 | 15 |
| Properties of Laminated Film | | | | | |
| Appearance | Good | Good | Good | Good | Good |
| 180° Separation Adhesive strength (g/15 mm breadth) | — | 700 | — | 240 | — |
| Resistance to heat creep (mm/hr)[3] | — | 0 | — | 0 | — |
| Creasability[4] | — | Good | — | Good | — |
| Resistance to kerosine[5] | — | Good | — | Good | — |
| Resistance to pulse[6] | Good | Good | Good | Good | Good |
| T-type Separation adhesive strength (g/15 mm breadth) | 550 | — | 310 | — | 550 |
| Heat seal strength[7] (Kg/15 mm breadth) | 6.1 | — | 3.3 | — | 4.1 |

Notes of Table 2

1) The abbreviations of the substrates stand for the followings.
  Nonasterisked paper: Printed art coat paper.
  Asterisked paper: Printed paper having a thickness of 0.5 mm and a window.
  OPP: Corona-treated, transparent, biaxially stretched polypropylene film of 15 μm.
  PVC: Transparent polyvinyl chloride resin film of 20 μm thick.
  ON: Polyamide film having a thickness of 15 μm and a colored printing thereon.
  LLDPE: Transparent low density polyethylene film of 40 μm thick.
  OPS: Transparent, biaxially stretched polystyrene film of 25 μm thick.
  PET: Polyethylene terephthalate film of having a thickness of 12 μm and a colored printing thereon.

2)
  UV: Ultraviolet rays
  E: Electron rays

Notes of Table 3

3) The substrates of a sample of laminated film of 25 mm in breadth were partly separated from each other and one of the substrates was turned inside out. The laminated film was heated at 50° C. for 60 minutes under a load of 50 g and then the length of the substrate separated from the other substrate was measured.

4) A sample of a laminated film was left standing at 50° C. for one hour after ceasing, and then there was observed whether separation of the substrates took place. "Good" means that no separation took place.

5) A sample of a laminated film was scored, immersed in kerosine for five seconds and air-dried. After 24 hours, there was observed whether separation of the substrates took place. "Good" means that no separation took place.

6) An index of adhesion when a laminated film was drawn quickly. "Good" means that no pulse failure took place, but failure of film or paper took place.

7) A couple of laminated films were pressed at 160° C. under a pressure of 2 Kg/cm² for one second with the polyethylene films inside, and then T-type separation adhesive strength was measured.

What is claimed is:

1. A photocurable adhesive which comprises:
   (a) a polyurethane poly(meth)acrylate having a polyurethane structure which contains α, α, α', α'-tetramethylxylylenediisocyanate as a main polyisocyanate component and having (meth)acryloyl groups in the molecule; and
   (b) an adhesive coupling agent in an amount of 0.05-10 parts by weight in relation to 100 parts by weight of the polyurethane poly(meth)acrylate.

2. The photocurable adhesive as claimed in claim 1 wherein the coupling agent is a silane coupling agent.

3. The photocurable adhesive as claimed in claim 1 wherein the coupling agent is a titanate coupling agent.

4. The photocurable adhesive as claimed in claim 1 wherein the coupling agent is an aluminum coupling agent.

5. The photocurable adhesive as claimed in claim 1 wherein the adhesive further contains a second photopolymerizable compound other than the polyurethane poly(meth)acrylate.

6. The photocurable adhesive as claimed in claim 1 wherein the adhesive further contains a photosensitizer in an amount of 0.01-20 parts by weight in relation to 100 parts by weight of the polyurethane poly(meth)acrylate.

7. The photocurable adhesive as claimed in claim 1 wherein the polyurethane structure contains a polyol component has a hydroxyl equivalent of about 70-2000.

8. The photocurable adhesive as claimed in claim 1 wherein the polyurethane structure contains α, α, α', α'-tetramethylxylylenediisocyanate in an amount of not less than 60% by weight based on the whole polyisocyanate component in the polyurethane structure.

9. The photocurable adhesive as claimed in claim 1 wherein the whole polyisocyanate component in the polyurethane structure in the polyurethane poly(meth)acrylate is substantially composed of α, α, α', α'-tetramethylxylylenediisocyanate.

* * * * *